(12) United States Patent
Sasaki et al.

(10) Patent No.: US 6,798,648 B2
(45) Date of Patent: Sep. 28, 2004

(54) PORTABLE ELECTRONIC APPARATUS HAVING A FLAT BOX SHAPED HOUSING

(75) Inventors: Katsumaru Sasaki, Ome (JP); Kohei Wada, Fussa (JP); Masataka Tokoro, Tachikawa (JP); Hajime Kotegawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 10/094,385

(22) Filed: Mar. 8, 2002

(65) Prior Publication Data
US 2002/0172002 A1 Nov. 21, 2002

(30) Foreign Application Priority Data

May 15, 2001 (JP) ........................................ 2001-145211

(51) Int. Cl.[7] ................................................. G06F 1/16
(52) U.S. Cl. ........................ 361/683; 361/687; 361/700; 343/702
(58) Field of Search ................................. 361/680, 681, 361/683, 732, 682, 686, 687, 695, 697; 248/551–553, 632, 638; 70/18, 58, 164; 362/85, 155, 109, 802; 349/6, 64, 65; 312/223.1, 223.2, 223.3, 723.2; 364/708.1, 231; D14/100–115; D18/1, 7, 11–12; 415/177, 178, 213.1, 241.1, 220, 221; 360/97.02, 98.01; 369/75.1; G06F 1/16

(56) References Cited

U.S. PATENT DOCUMENTS

| | | | | |
|---|---|---|---|---|
| 4,497,036 A | * | 1/1985 | Dunn ........................... | 361/680 |
| D339,113 S | * | 9/1993 | Kelly et al. ................. | D14/100 |
| D355,171 S | * | 2/1995 | Derocher .................... | D14/106 |
| D389,815 S | * | 1/1998 | Schnatzmeyer ............. | D14/106 |
| 5,768,093 A | * | 6/1998 | Howell et al. .............. | 361/680 |
| 5,768,095 A | * | 6/1998 | Nakamura et al. .......... | 361/681 |
| D396,220 S | * | 7/1998 | Lee ............................ | D14/100 |
| 5,883,820 A | | 3/1999 | Ota | |
| 6,181,284 B1 | * | 1/2001 | Madsen et al. ............. | 343/702 |
| 6,212,067 B1 | | 4/2001 | Nakajima et al. | |
| 6,385,037 B2 | * | 5/2002 | Howell et al. .............. | 361/683 |
| D464,344 S | * | 10/2002 | Jobs et al. .................. | D14/318 |
| 6,477,871 B1 | * | 11/2002 | Shaw et al. ................. | 70/58 |
| 6,507,488 B1 | * | 1/2003 | Cipolla et al. .............. | 361/687 |
| 6,561,668 B2 | * | 5/2003 | Katayama et al. .......... | 362/85 |
| 2003/0016495 A1 | * | 1/2003 | Hongo ........................ | 361/687 |

* cited by examiner

Primary Examiner—Michael Datskovsky
(74) Attorney, Agent, or Firm—Pillsbury Winthrop LLP

(57) ABSTRACT

An electronic apparatus including a first housing and a second housing. The first housing has a top wall, a left side wall, and a right side wall. The second housing is supported on the first housing. The top wall has a plurality of stepped parts at its peripheral parts that are connected to the left side wall and the right side wall. The stepped parts incline, lying at a level lower than the top wall. The second housing can be rotated from a closed position to an opened position, and vice versa. The second housing covers the top wall when in the closed position, and stands upright and exposes the top wall when in the opened position. The second housing has a plurality of extensions that cover the stepped parts when in the closed position.

7 Claims, 8 Drawing Sheets

PORTABLE ELECTRONIC APPARATUS HAVING A FLAT BOX SHAPED HOUSING

CROSS-REFERENCE TO RELATED APPLICATIONS

This application is based upon and claims the benefit of priority from prior Japanese Patent Application No. 2001-145211, filed May 15, 2001.

BACKGROUND OF THE INVENTION

1. Field of the Invention

The present invention relates to an electronic apparatus such as a portable computer. More particularly, the invention relates to a structure that makes the apparatus housing appear thin.

2. Description of the Related Art

An electronic apparatus, such as a portable computer, comprises a housing and a display unit. The housing has a keyboard. The display unit incorporates a liquid crystal display panel. The display unit is supported on the housing and can be rotated to move between a closed position and an opened position. In the closed position, the display unit lies in a horizontal plane, covering the keyboard. In the opened position, the display unit stands upright, exposing the keyboard and the liquid crystal display panel. When rotated into the closed position, the display unit overlaps the housing. As long as the display unit overlaps the housing, the electronic apparatus remains like a flat box.

Electronic apparatuses of this type will attain a high commercial value if they are compact and excel in portability. The housing of a portable apparatus, which contains functional components, such as a hard disk drive, a circuit board and the like, needs to be as thin as possible, while retaining a desirable outer appearance.

To render the housing as thin as desired, various measures have been taken. First, the functional components to be incorporated into the housing have been made smaller and thinner. Second, the wall thickness of the housing has been reduced. Third, the layout of components has been changed to help decrease the thickness of the housing. Fourth, the number of components required has been reduced to a minimum.

Recent years saw a rapid advancement in communications systems, each comprising electronic apparatuses and a network that supports the apparatuses. In the communications systems, portable electronic apparatuses are used in increasing numbers. It is demanded that the housing of the electronic apparatus be thinner so that the apparatus may be more portable.

It is no exaggeration to say that the apparatus housing and the functional components can no longer be made thinner. The apparatus housing cannot be expected to be thinner. It is now desired that the housing be designed to appear as thin as possible, no matter where it is used.

BRIEF SUMMARY OF THE INVENTION

The present invention has been made in view of the foregoing. An object of the invention is to provide a portable electronic apparatus comprising a housing that is designed to appear thinner and more compact than it actually is.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of this invention, or a portable computer, will be described with reference to the accompanying drawings.

Figure 1:
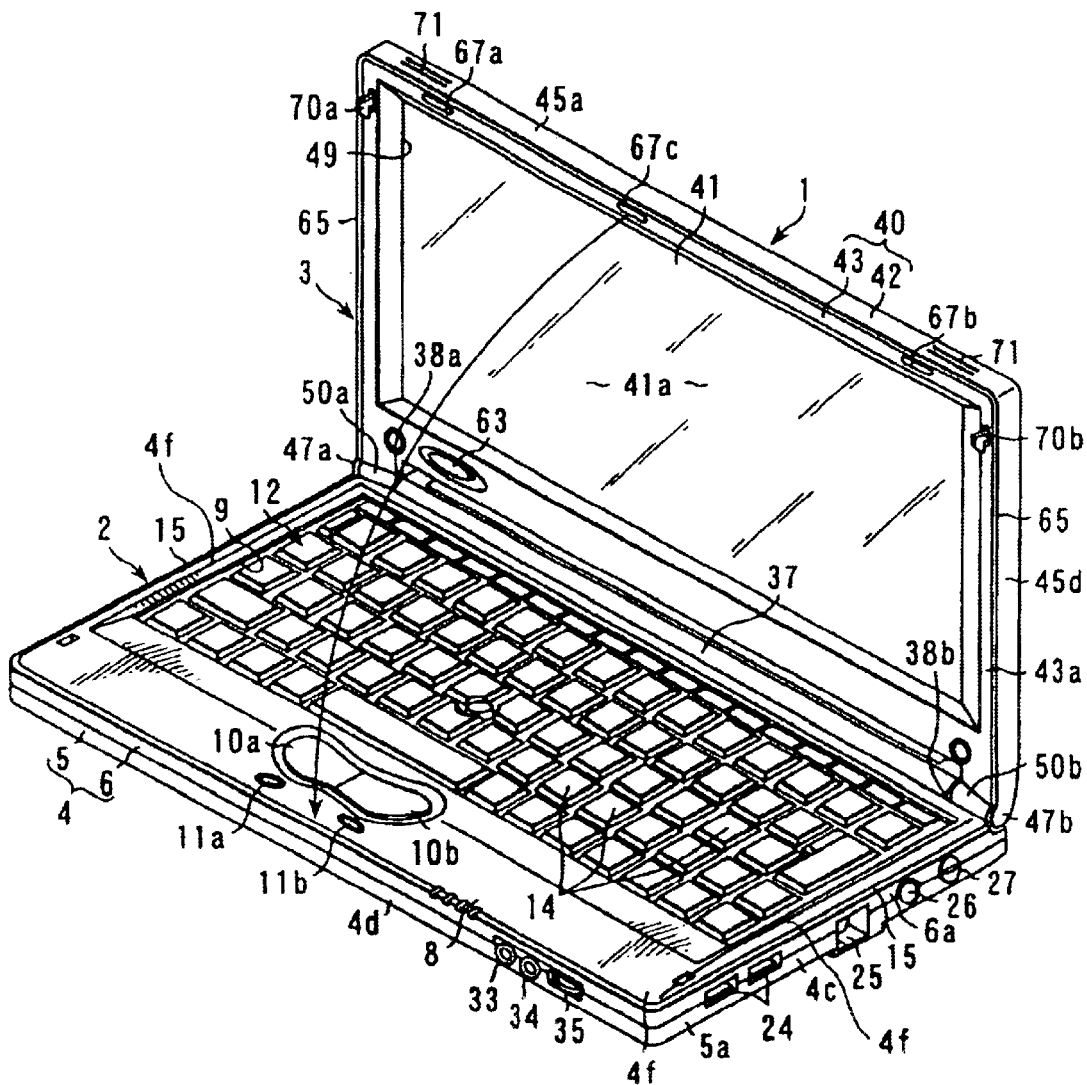
FIG. 1 is a perspective view of a portable computer according to an aspect of the present invention.

FIG. 1 shows the portable computer 1 that is a small portable electronic apparatus. The portable computer 1 comprises a main unit 2 and a display unit 3. The main unit 2 may be placed on an installation surface G such as the upper surface of the top plate of a desk. The display unit 3 is supported on the main unit 2.

As FIGS. 2 to 5 show, the main unit 2 comprises a housing 4 made of synthetic resin. The housing 4 is shaped like a flat rectangular box. It comprises a bottom wall 4a, a left side wall 4b, a right side wall 4c, a front wall 4d, a rear wall 4e, and a top wall 4f. In the illustrated example, the housing 4 is almost twice as wide as it is deep.

The housing 4 comprises a base 5 and a top cover 6. The top cover 6 is coupled with the base 5. The base 5 includes the bottom wall 4a and a plurality of walls 5a. The walls 5a stand upwards from the edges of the bottom wall 4a. The top cover 6 includes the top wall 4f and a plurality of walls 6a. The walls 6a extend downwards from the edges of the top wall 4f. The walls 5a abut on the walls 6a, respectively, forming the left side wall 4b, right side wall 4b, front wall 4d, and rear wall 4e.

The top wall 4f opposes the bottom wall 4a. The top wall 4f includes a palm rest 8 and an opening 9. The palm rest 8 lies at the front part of the top wall 4f and extends in the width direction of the housing 4. The palm rest 8 gently and downwardly inclines to its front edge, which meets the upper edge of the front wall 4d.

A pair of control buttons 10a and 10b (first pair of switch buttons) and a pair of scroll buttons 11a and 11b (second pair of switch buttons) are arranged on the center part of the palm rest 8. The control buttons 10a and 10b are spaced apart in the width direction of the housing 4. The scroll buttons 11a and 11b are smaller than the control buttons 10a and 10b. The scroll buttons 11a and 11b are located in front of the control buttons 10a and 10b, respectively, and are spaced apart from each other in the width direction of the housing 4. The scroll buttons 11a and 11b protrude upwards a little from the palm rest 8.

Figure 2:
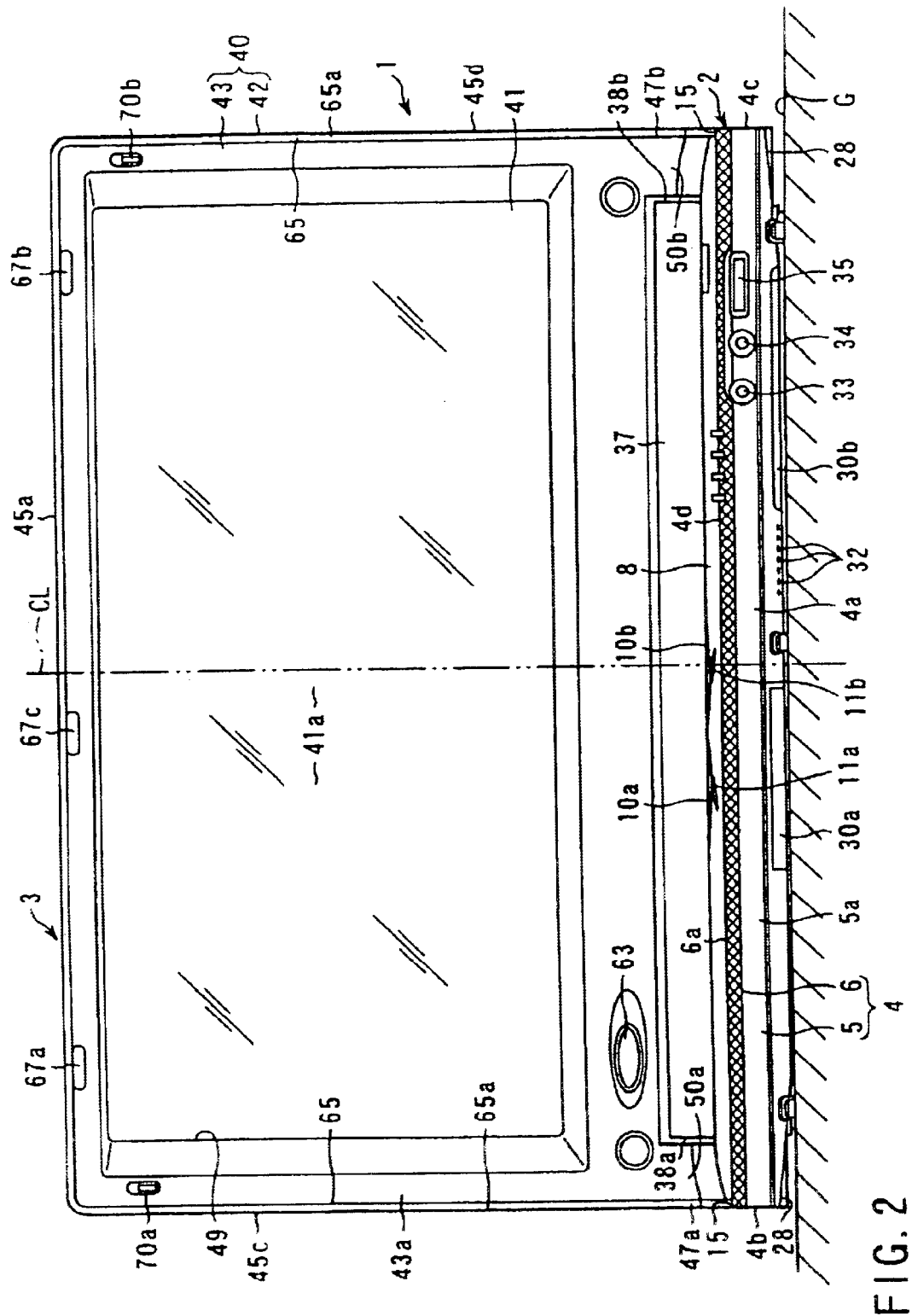
FIG. 2 is a front view of the portable computer, showing the display unit rotated to the opened position.

FIG. 2 is a front view of the portable computer 1. As seen from FIG. 2, the control button 10a and scroll button 11a are positioned to the left of the center line CL of the housing 4, while the control button 10b and the scroll button 11b lie on the center line CL, as viewed from the front of the computer 1.

The opening 9 is located at the back of the palm rest 8. The opening 9 is a rectangular hole that extends in the width direction of the housing 4. A keyboard 12 is fitted in the opening 9. The keyboard 12 comprises a keyboard panel 13 and a plurality of key tops 14. The keyboard panel 13 is fitted in the opening 9. The key tops 14 are arranged on the upper surface of the keyboard panel 13. Each key top 14 has an upper surface at which it is depressed with a finger. The upper surface of each key top 14 lies almost in flush with the top wall 4f of the main unit 2.

Figure 6:
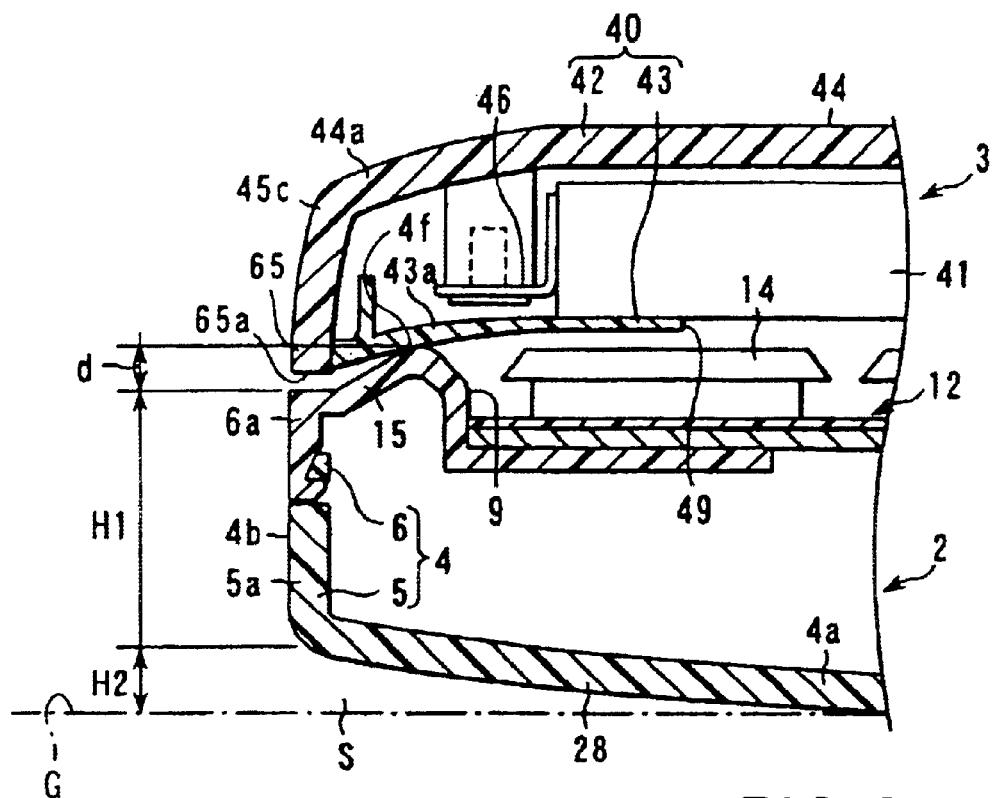
FIG. 6 is a sectional view of the portable computer, showing a stepped part of the main unit and an extension part of the display housing, said extension part covering the stepped part.
Figure 7:
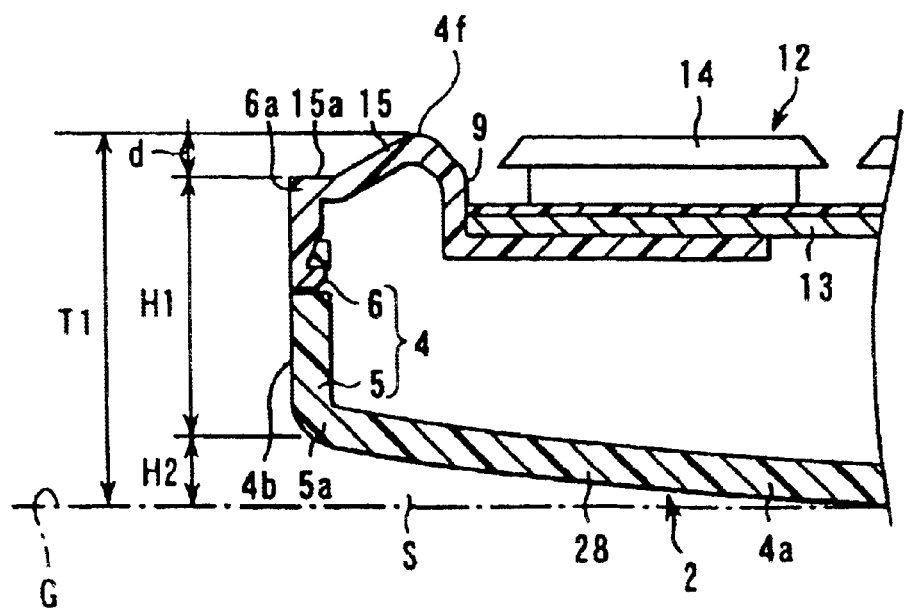
FIG. 7 is a sectional view of the personal computer, illustrating the stepped part of the main unit.

As shown in FIGS. 1, 6 and 7, the top wall 4f has left and right edges that are connected to the left side wall 4b and the right side wall 4c, respectively. The left and right edges of the top wall 4f have a stepped part 15 each. The stepped parts 15 are positioned at the left and right ends of the top wall 4f, respectively. The keyboard 12 is clamped between the stepped parts 15, on the one hand, and the top wall 4f, on the other hand. The stepped parts 15 lie at a level lower than the top wall 4f. The stepped parts 15 extend in the depth direction of the main unit 2, from the rear edge of the housing 4 to the rear edge of the palm rest 8. The front of each stepped part 15 is connected to the rear edge of the palm rest 8, forming a smooth junction with the rear edge of the palm rest 8.

The stepped parts 15 are identical in shape. Therefore, only the stepped part 15 positioned at the left end of the top wall 4f will be described in detail, with reference to FIG. 7. As is obvious from FIG. 7, this stepped part 15 inclines downwards, extending along a gentle arc to the upper edge of the left side wall 4b. This stepped part 15 has its bottom 15a lying at a level lower than the upper surfaces of the key tops 14.

Figure 5:
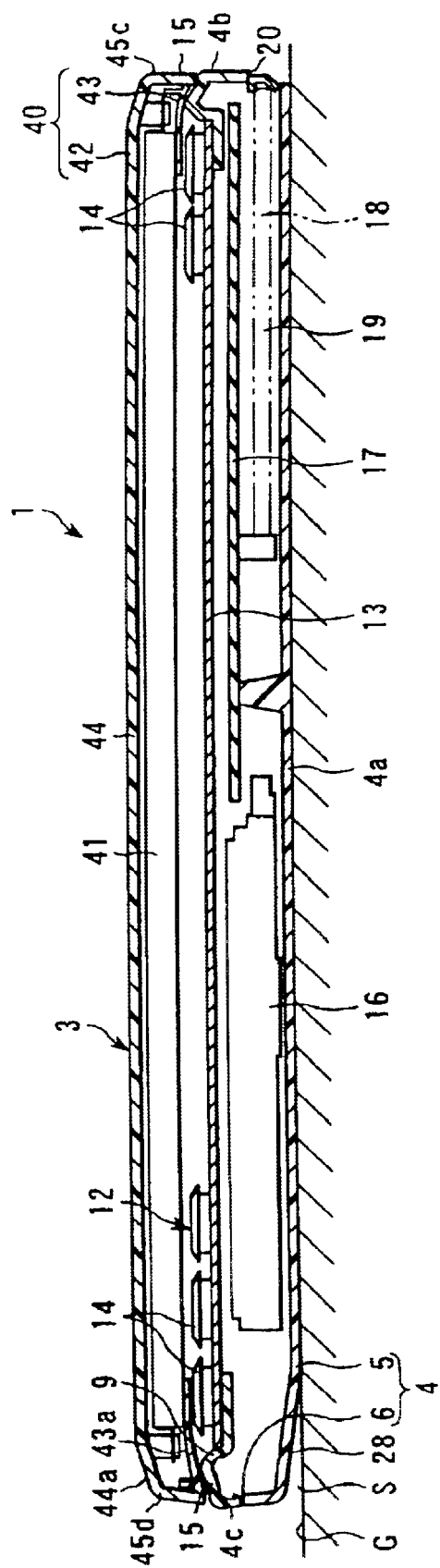
FIG. 5 is a sectional view of the portable computer, taken along line F5—F5 in FIG. 3.

As FIG. 5 shows, the housing 4 incorporates a hard disk drive 16 and a circuit board 17. The hard disk drive 16 is located below the keyboard 12. The circuit board 17 extends parallel to the bottom wall 4a of the housing 4. Various circuit components (not shown) are mounted on the circuit board 17. These components include a semiconductor package that constitutes a microprocessor.

Figure 3:
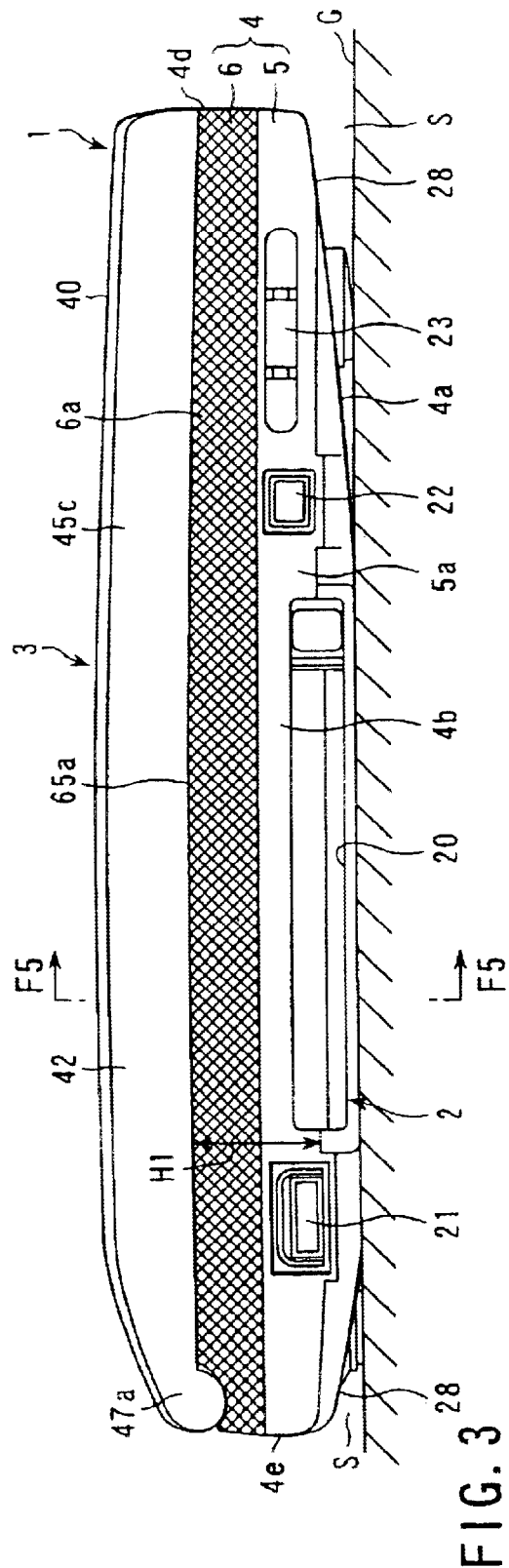
FIG. 3 is a left-side view illustrating the positional relation that the display unit has with respect to the main unit while it stays in the closed position.

A card receptacle 19 is provided between the circuit board 17 and the bottom wall 4a. A PC card 18 may be inserted into the card receptacle 19. The receptacle 19 has a card slot 20, which is best shown in FIG. 3. The card slot 20 opens in the left side wall 4b of the housing 4. A RGB connector 21 and an i.LINK (IEEE1394) connector 22 are provided on the left side wall 4b. The left side wall 4b has an air port 23 that extends to a cooling fan. The connectors 21 and 22 and the air port 23 are arranged in a row.

Figure 4:
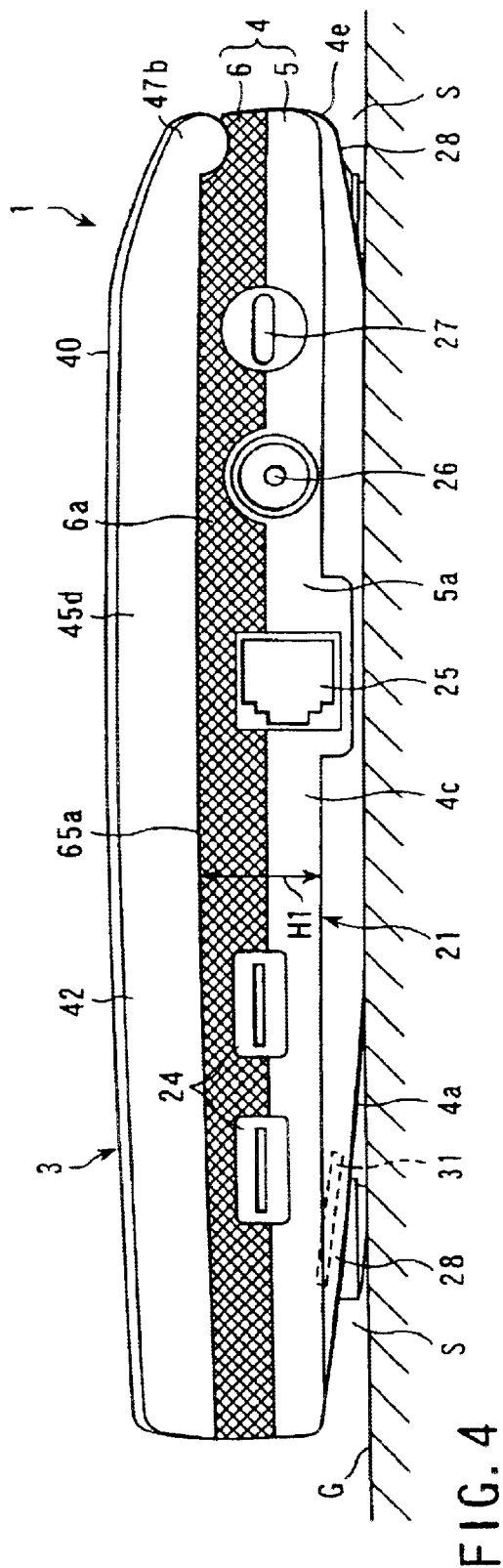
FIG. 4 is a right-side view depicting the positional relation that the display unit has with respect to the main unit while it stays in the closed position.

As FIG. 4 shows, a pair of USB connectors 24, a modem connector 25 and a power connector 26 are provided on the right side wall 4c of the housing 4. The right side wall 4c has a lock hole 27. The USB connectors 24, modem connector 25, power connector 26 and lock hole 27 are arranged in a row. The lock hole 27 may accommodate a theft-preventing device. The modem connector 25 is located at the middle part of the right side wall 4c. The modem connector 25 is electrically connected to the modem board (not shown) that is incorporated in the housing 4.

As shown in FIG. 5, the bottom wall 4a of the housing 4 lies on the installation surface G. The bottom wall 4a has four edges that are connected to the left side wall 4b, right side wall 4c, front wall 4d and rear wall 4e, respectively. The edge portions of the bottom wall 4a incline upwards, each extending along a gentle arc, except for the parts at which the card receptacle 19 and the modem connector 25 are provided. The edge portions of the bottom wall 4a are gradually spaced from the installation surface G as they extend toward the left side wall 4b, right side wall 4c, front wall 4d and rear wall 4e, respectively. A gap S therefore exists between the installation surface G and each edge portion of the bottom wall 4a.

The lower ends of the left side wall 4b, right side wall 4c, front wall 4d and rear wall 4e are spaced from the installation surface G by the gap S. As can be understood from FIG. 7, the left side wall 4b has a height H1 that is a difference between the height T1 of the housing 4 and the sum of the height d of the stepped parts 15 and the height H2 of the gap S. Hence, the left side wall 4b is less tall than the height of the housing 4. The same holds true of the right side wall 4c.

Figure 8:
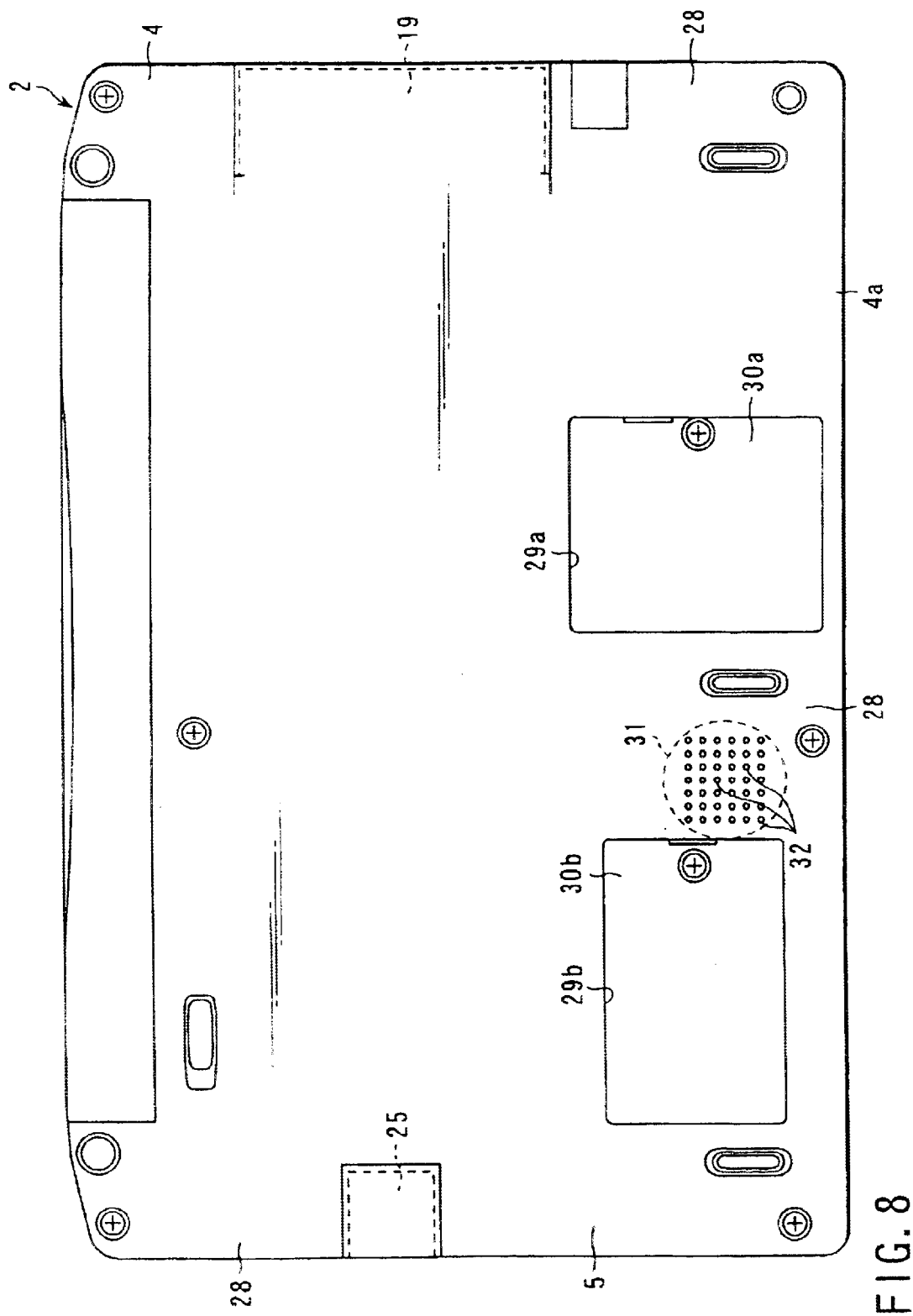
FIG. 8 is a plan view of the main unit seen from its bottom.

As FIG. 8 shows, the bottom wall 4a of the housing 4 has two openings 29a and 29b. The first opening 29a exposes the additional memory sockets (not shown). The second opening 29b exposes the label bonded to the modem board. The openings 29a and 29b are usually closed with removable covers 30a and 30b.

The housing 4 contains a loudspeaker 31. As FIGS. 4 and 8 show, the loudspeaker 31 is located at the front of the housing 4. It sends out an acoustic wave toward the bottom wall 4a. The loudspeaker 31 is mounted on the inclined, front edge part 28 of the bottom wall 4a. The inclined part 28 has through holes 32 that oppose the loudspeaker 31. The through holes 32 open to the gap S between the portable computer 1 and the installation surface G. The acoustic wave emanating from the loudspeaker 31 can propagate into the gap S through the holes 32. The sound the loudspeaker 31 has generated can smoothly come out from the housing 4, though the loudspeaker 31 is mounted on the bottom wall 4a.

A microphone input terminal 33, a headphone output terminal 34, and a volume dial 35 are arranged in a row on the right end part of the front wall 4d.

Figure 9:
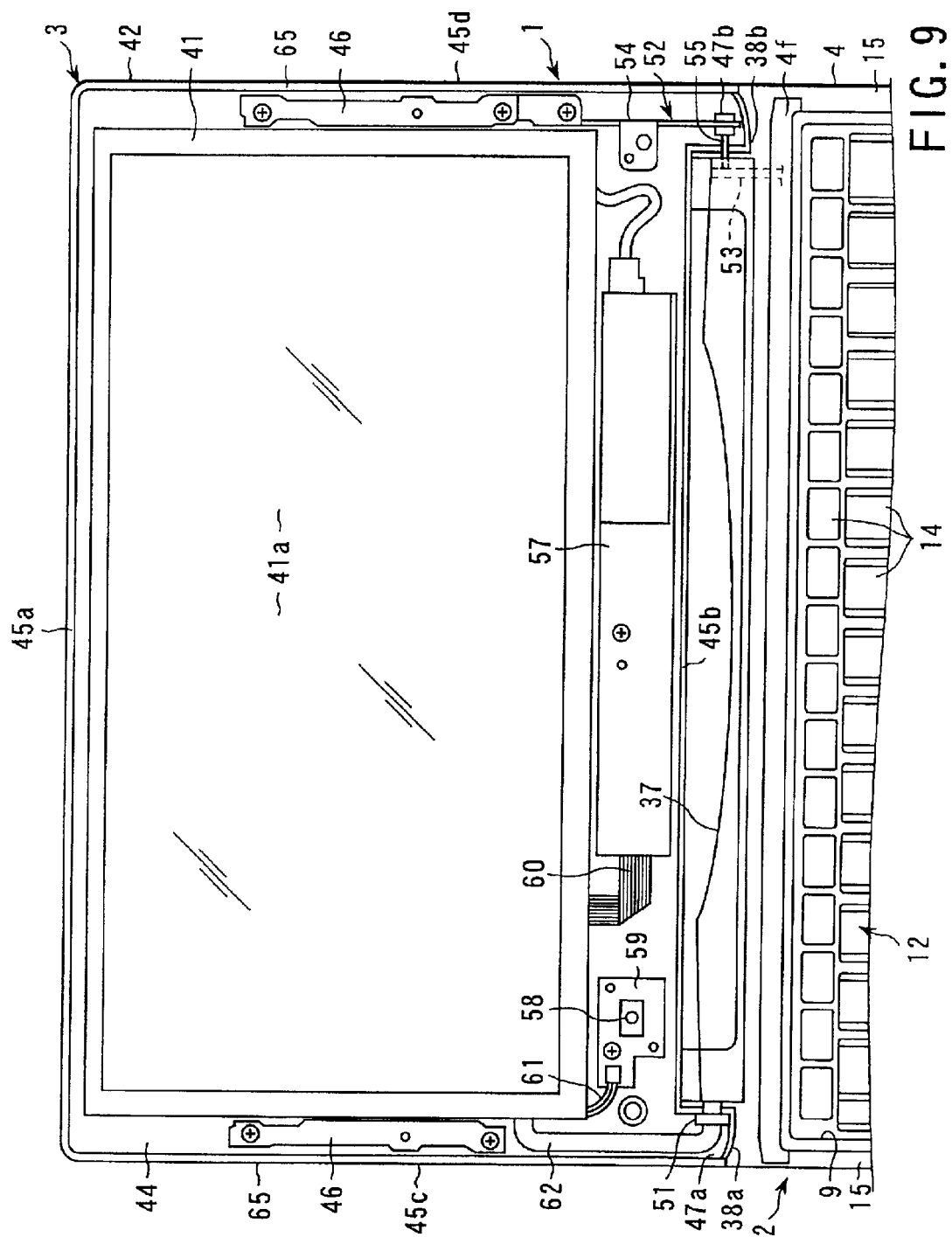
FIG. 9 is a plan view of the portable computer, showing the positional relation between the cable and the hinge device that supports the display housing.

As FIGS. 1, 2 and 9 show, the housing 4 has a projection 37 at the rear edge of the top wall 4f. The projection 37 is provided at the back of the keyboard 12 and extends in the width direction of the housing 4. The projection 37 has a pair of display-supporting sections 38a and 38b. The sections 38a and 38b have a recess each, which opens in the circumferential surface of the projection 37. The sections 38a and 38b are spaced apart from each other in the width direction of the housing 4.

The display unit 3 comprises a display housing 40 and a liquid crystal display (LCD) panel 41. The display housing 40 is made of synthetic resin. The LCD panel 41 is incorporated in the display housing 40.

As FIGS. 5 and 6 show, the display housing 40 is a flat rectangular box. The housing 40 comprises a display cover 42 and a display mask 43. As clearly seen from FIG. 9, the display cover 42 comprises a support wall 44 and four peripheral walls 45a to 45d. The support wall 44 has almost the same size as the top wall 4f of the housing 4. The peripheral walls 45a, 45b, 45c and 45d rise from the four edges of the support wall 44, respectively. The first and second walls 45a and 45b are spaced from each other in the height direction of the display cover 42. The third and fourth peripheral walls 45c and 45d are spaced from each other in the width direction of the display cover 42.

The display cover 42 has two legs 47a and 47b. Both legs 47a and 47b protrude from one edge of the support wall 44 and extend toward the display-supporting sections 38a and 38b, respectively. The first and second legs 47a and 47b are spaced apart in the width direction of the display cover 42. The projection 37 on the main unit 2 is located between the first leg 47a and the second leg 47b.

The LCD panel 41 is mounted on the support wall 44 of the display cover 42 and surrounded by the first to fourth peripheral walls 45a to 45d. A pair of brackets 46 secures the LCD panel 41 to the support wall 44.

The display mask 43 is shaped like a rectangular frame and has a rectangular opening 49. The display mask 43 fills the gap between the LCD panel 41 and the first to fourth peripheral walls 45a to 45d of the display cover 42. The LCD panel 41 has a display screen 41a, which is exposed through the opening 49 of the display mask 43. The display mask 43 has a pair of covers 50a and 50b. The covers 50a and 50b cover the first and second legs 47a and 47b, respectively.

The display mask 43 is fitted in the recess defined by the first to fourth peripheral walls 45a to 45d. The mask 43 is thereby removably secured to the display cover 42. The junction between the display cover 42 and the display mask 43 is covered, in its entirety, with the first to fourth peripheral walls 45a to 45d. Thus, the first peripheral wall 45a, third peripheral wall 45c, and fourth peripheral wall 45d constitute the top, left, and right edges of the display housing 40.

Figure 10:
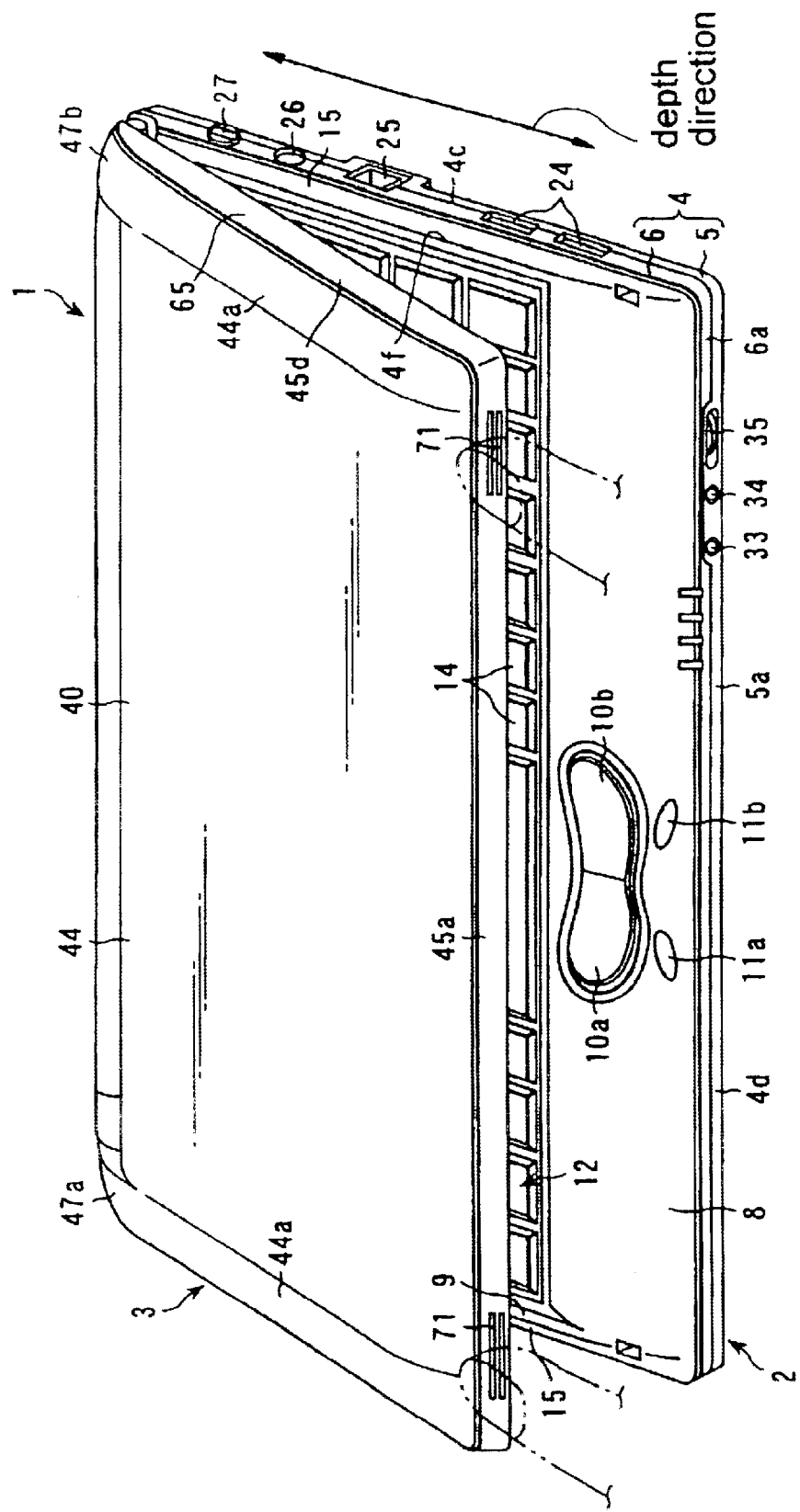
FIG. 10 is a perspective view of the portable computer, showing the display housing rotated with fingers, from the closed position toward the opened position.

As illustrated in FIGS. 6 and 10, the support wall 44 of the display cover 42 has two curved part 44a at its left and right ends. The curved parts 44a incline toward the third and fourth peripheral walls 45c and 45d, respectively, each curved along a gentle arc. In other words, the left and right end parts of the display housing 40 have their thickness gradually decreasing toward the outside. This configuration makes the housing 40 look thinner than it actually is.

As FIG. 9 shows, a cable guide 51 and a hinge device 52 connects the display housing 40 to the housing 4 of the main unit 2. The cable guide 51 horizontally extends between the first leg 47a of the display cover 42 and the left end of the projection 37 provided on the housing 4. The interior of the main unit 2 and the interior of the display housing 40 communicate through the cable guide 51.

The hinge device 52 has two brackets 53 and 54 and a hinge shaft 55. The first bracket 53 is secured to the housing 4 of the main unit 2 and positioned on the right of the projection 37. The second bracket 54 is fastened to the right side of the support wall 44 of the display cover 42. One end of the second bracket 54 is led into the second leg 47b of the display cover 42. The hinge shaft 55 couples the first and second brackets 53 and 54 and can rotate. The shaft 55 horizontally extends between the projection 37 of the housing 4 and the second leg 47b of the display housing 40.

Hence, the display housing 40 can rotate around the hinge shaft 55 acting as a fulcrum, between a closed position and an opened position. At the closed position, the display housing 40 lies over the palm rest 8 and keyboard 12, covering them from above. At the opened position, the display housing 40 stands up, exposing the palm rest 8, keyboard 12 and display screen 41a.

As seen from FIG. 9, a FL (fluorescent light) inverter 57 and a switch board 59 are secured to the support wall 44 of the display cover 42. The FL inverter 57 is provided to drive the back light incorporated in the LCD panel 41. The FL inverter 57 is accommodated in a gap between the LCD panel 41 and the second peripheral wall 45b of the display cover 42. The switch board 59 has a power switch 58 mounted on it. The switch board 59 faces away from the hinge device 52.

Two cables 60 and 61 are connected to the FL inverter 57 and the switch board 59, respectively. Another cable (not shown) is connected to the LCD panel 41. The three cables are put together, forming a cable bundle 62. The cable bundle 62 passes through the first leg 47a and is led into the housing 4 through the cable guide 51. The bundle 62 has its distal end electrically connected to the circuit board 17 incorporated in the housing 4.

Therefore, the hinge device 52 does not hinder the laying-out of the cable bundle 62 or lengthen the path of the cable bundle 62. This configuration makes it easy to lay the cable bundle 62, ultimately enhancing the efficiency of assembling the portable computer 1.

As FIGS. 1 and 2 shows, a switch button 63 is arranged on the left end part of the display mask 43. When pushed, the switch button 63 actuates the power switch 58. The switch button 63 is located adjacent to the first leg 47a and can be easily pushed with the thumb of the operator's left hand. It remains concealed as long as the display housing 40 stays at the closed position. It is exposed when the display housing 40 is rotated to the opened position.

The switch button 63 would not be pushed by mistake so long as the display housing 40 remains in the closed position as the portable computer 1 is being carried in a bag or the like. The computer 1 need not have a mechanism for locking the switch button 63 or a special member, such as a shutter, for covering the switch button 63. The portable computer 1 can be simple in structure and can be manufactured at low cost.

Two extensions 65 extend forward from the third peripheral wall 45c and the fourth peripheral wall 45d of the display cover 42, respectively. The extensions 65 overlap the stepped parts 15 of the main unit 2, covering the outer sides of the parts 15, when the display unit 40 is rotated to the closed position. In this condition, the distal end 65a of each extension 65 opposes the bottom 15a of the stepped part 15, defining a small gap between it and the bottom 15a of the stepped part 15.

Once the display housing 40 is rotated to the closed position, the front ends of the extensions 65 oppose the left and right ends of the palm rest 8, respectively. The distal end 65a of each extension 65 inclines in the same manner as the palm rest 8 does. Hence, the gap between the third peripheral wall 45c and the left side wall 4b of the housing 4 is substantially uniform in the depth direction of the computer 1, as is illustrated in FIG. 3, which is a left side view of the computer 1. Similarly, the gap between the fourth peripheral wall 45d and the right side wall 4c of the housing 4 is substantially uniform in the depth direction of the computer 1, as seen from FIG. 4, which is a right side view of the computer 1.

As FIG. 6 shows, the outer edge 43a of the display mask 43 extends toward the distal end 65a of the extension 65. The outer edge 43a is curved along the stepped part 15. The outer edge 43a opposes the stepped part 15 while the display housing 40 remains at the closed position.

As seen from FIGS. 1 and 2, the display mask 43 has three stoppers 67a, 67b and 67c. The first, second and third stoppers 67a, 67b and 67c abut on the front edge of palm rest 8 when the display housing 40 is rotated to the closed position. They are made of elastic, cushion material such as rubber. They are bonded to the front of the display mask 43 with double-side coated, adhesive tape. The first, second and third stoppers 67a, 67b and 67c protrude a little from the display mask 43.

The first, second and third stoppers 67a, 67b and 67c are arranged in a row, each spaced from another, in the width direction of the display mask 43. The first and second stoppers 67a and 67b are positioned symmetrically with respect to the centerline CL of the main unit 2. The stoppers 67a and 67b are provided on the left and right edge parts of the display mask 43, respectively. The third stopper 67c is located between the first and second stoppers 67a and 67b, on the left of the centerline CL of the main unit 2. The third stopper 67c abuts on the palm rest 8, at a midpoint between the scroll buttons 11a and 11b, when the display housing 40 is rotated to the closed position as is indicated by the arrow show in FIG. 1.

After the display housing 40 has been rotated to the closed position, the display mask 43 opposes the palm rest 8 and remains spaced therefrom by a distance equal to the height of the first to third stoppers 67a to 67c. Thus, the display mask 43 is prevented from contacting the palm rest 8.

As described above, the third stopper 67c abuts on the palm rest 8, at a midpoint between the scroll buttons 11a and 11b, when the display housing 40 is rotated to the closed position. Thus, those parts of the display mask 43 which face the scroll buttons 11a and 11b are deformed but very little when an external force, if any, pushes the display housing 40 onto the palm rest 8 while the display housing 40 stays at the closed position.

Therefore, neither the front of the display mask 43 nor the display screen 41a of the LCD panel 41 interferes with the control buttons 10a and 10b or the scroll buttons 11a and 11b. The front of the display mask 43 and the display screen 41a can thus be prevented from being scratched.

This advantage is attained because the scroll buttons 11a and 11b, which are smaller than the control buttons 10a and 10b, are arranged in front of the control buttons 10a and 10b. The advantage cannot be achieved if the control buttons 10a and 10b are positioned in front of the scroll buttons 11a and 11b.

As FIG. 1 shows, the display housing 40 has a pair of latches 70a and 70b that protrude from the front of the display mask 43. The latches 70a and 70b are provided at the left and right edges of the display mask 43, respectively. The display screen 41a is therefore located between the latches 70a and 70b. The latches 70a and 70b catch the palm rest 8 when the display housing 40 is rotated to the closed position.

Once they catch the palm rest 8, they hold the display housing 40 at the closed position.

When the display housing 40 is rotated to the closed position, the first peripheral wall 45a of the display cover 42 comes into alignment with the front wall 4d of the housing 4. The first peripheral wall 45a has a pair of finger rests 71. The finger rests 71 are spaced from each other in the width direction of the display housing 40. As FIG. 10 shows, each finger rest 71 is composed of a plurality of parallel strips. Hence, when the user of the computer 1 touches the finger rests 71 with the thumbs, the thumbs would not slip over the finger rests 71. If the user then pushes up the display housing 40 with the thumbs, he or she can rotate the housing 40 from the closed position to the opened position. Thus, even a person who has small hands and cannot grab the display housing 40 can easily open the display housing 40.

The base 5 of the housing 4 and the display cover 42 of the display housing 40 are painted in a bright color, for example, silver. On the other hand, the top cover 6 and the display cover 43 are painted in a dark color, for example, black, as can be perceived from the shade shown in FIGS. 2 to 4.

The extensions 65 of the display cover 42, which are painted silver and shiny, surround the display mask 43 painted black, while the display housing 40 remains at the opened position, exposing the display screen 41a. The extensions 65 are a design feature that accentuates or characterizes the outer appearance of the display housing 40.

As is best illustrated in FIGS. 3 and 4, the top cover 6 painted black is interposed between the base 5 and the display cover 42, both painted silver, while the display housing 40 remains at the closed position. The top cover 6 therefore stands in vivid contrast against the base 5 and display cover 42. The walls 6a of the top cover 6 therefore stand out, each as a black stripe.

As indicated above, the top wall 4f have stepped parts 15 at its left and right ends. The stepped parts 15 lie at a level lower than the top wall 4f and extend from the rear edge of the housing 4 to the rear edge of the palm rest 8. The upper edges of the left and right side walls 4b and 4c lie below by a distance equal to the depth d of the stepped parts 15. Further, the sides of the bottom wall 4a of the housing 4 incline gradually upwards, toward the left, right, front and rear walls 4b, 4c, 4d and 4e, respectively. The lowest parts of the walls 4b, 4c, 4d and 4e therefore lie above the installation surface G.

The left side wall 4b and the right side wall 4c therefore have a height H1 that is smaller than the height T1 of the entire housing 4. This configuration makes the housing 4 of the main unit 2 appears thinner than it actually is.

Moreover, the peripheral wall 6a of the top cover 6 that constitutes the upper halves of the left and right side walls 4c and 4d is exposed, looking like one black stripe. The upper halves of the left and right side walls 4c and 4d are therefore visually accentuated, attracting people's eyes. This configuration makes the left and right side walls 4c and 4d and the front wall 4d appear thinner than they actually are.

In addition, the third and fourth peripheral walls 45c and 45d of the display cover 42 have extensions 65 that overlap the stepped parts 15 of the housing 4 when the display housing 40 is rotated to the closed position. Therefore, the top wall 4f of the housing 4 and the key tops 14 all lie at levels higher than the bottoms 15a of the stepped parts 15 while the display housing 40 remains at the closed position, looking as if they were incorporated in the display housing 40.

Thus, the housing 4 of the main unit 2 can look thinner than it actually is. The main unit 2 as a whole appears thinner than it actually is, too.

As seen from FIGS. 3 and 4, the peripheral wall 6a of the top cover 6 appears as a black stripe as long as the display housing 40 remains closed. Because this black stripe lies between the base 5 and the display cover 42, the upper halves of the left and right side walls 4b and 4c and the front wall 4d are visually accentuated, attracting people's eyes. This configuration effectively makes the main unit 2 appear thinner.

Furthermore, the display mask 42 of the display housing 40 is fitted in the recess that is defined by the first to fourth peripheral walls 45a to 45d. In other words, the peripheral walls 45a to 45d surround the display mask 43. Hence, the first peripheral wall 45a, third peripheral wall 45c and fourth peripheral wall 45d constitute the top, left and right edges of the display housing 40.

Therefore, the junction between the display cover 42 and the display mask 43 is never exposed at the outer edges of the display housing 40. The display housing 40 looks neat and tidy as a whole. This configuration also helps the main unit 2 and the display housing 40 appear thinner than they actually are.

In the embodiment described above, the stepped parts are formed at the left and right edges of the top wall, which are connected to the left and right side walls, respectively. Nonetheless, the front edge of the top wall, which is connected to the front wall, may have a stepped part, too.

Moreover, the portable electronic apparatus according to the present invention is not limited to a portable computer. The invention may be applied to, for example, a DVD player, too.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic apparatus, comprising:

a first housing having a top wall, a left side wall and a right side wall and a second housing supported on the first housing and configured to be rotated from a closed position to an opened position, and vice versa, to cover the top wall when in the closed position and to stand upright and expose the top wall when in the opened position, wherein the first housing has a plurality of stepped parts at a peripheral edge of the top wall, the stepped parts lie at a level lower than the top wall and are connected to the left side wall and the right side wall, and the second housing has a plurality of extensions that cover the stepped parts when in the closed position, wherein the second housing includes a cover and a mask, the cover having a support wall supporting a display panel and a plurality of peripheral walls surrounding the display panel and the support wall, and the mask being coupled to the cover, having an opening exposing the display panel and being removably fitted in a recess defined by the peripheral walls of the cover and wherein a palm rest has a first pair of switch buttons spaced apart in a width direction of the first housing and a second pair of switch buttons located in front of the first pair of switch buttons and spaced apart in the width direction of the first housing, the mask has a plurality of stoppers that abut on the palm rest when the second housing is rotated to the closed position, the stoppers ar arranged in a row and spaced apart in a width direction of the second housing, and a middle stopper abuts on the palm rest at a position between the second pair of switch buttons when the second housing is rotated to the closed position.

2. A portable electronic apparatus, comprising:

a first housing having a top wall; and a second housing coupled to the first housing and configured to be rotated from a closed position to an opened position, and vice versa, to cover the top wall when in the closed position and to stand upright and expose the top wall when in the opened position, wherein the first housing as a plurality of stepped parts along a slope at a peripheral edge of the top wall, the stepped parts lie at level lower than the top wall, the slope having a first portion which inclines downward away from a center of the first housing and a second portion which inclines downward towards the center of the first housing, and the second housing has a plurality of extensions that cover the stepped parts in correspondence to the lope when in the closed position.

3. A portable electronic apparatus comprising:

a first housing having a top wall;

a second housing coupled to the first housing and configured to be rotated from a closed position to an opened position, and vice versa, to cover the top wall when in the closed position and to stand upright and expose the top wall when in the opened position, wherein the first housing has a plurality of stepped parts along a slope at a peripheral edge of the top wall, wherein the slope of the stepped parts inclines downward towards a center of the portable electronic apparatus, the stepped parts lie at a level lower than the top wall, and the second housing has a plurality of extensions that cover the stepped parts in correspondence to the slope when in the closed position.

4. A portable electronic apparatus accordingly to claim 2, wherein the second housing includes a cover and a mask, the cover has a support wall supports a display panel and a plurality of peripheral walls surrounding the display panel and the support wall, and the mask is coupled to the cover, has an opening exposing the display panel and is removably fitted in a recess defined by the peripheral walls of the cover.

5. A portable electronic apparatus according to claim 4, wherein the slope comprises a pointed end defined by an upper end of the first portion and an upper end of the second portion, and the mask of the second housing abuts the pointed end when the second housing is in the closed position.

6. A portable electroni apparatus according to claim 2, wherein the first housing having a left side wall, a right side wall and a bottom wall, the stepped parts are connected to the left side wall and the right side wall.

7. A portable electronic apparatus according to claim 6, wherein the bottom wall has peripheral parts that are connected to the left side wall and the right side wall, the peripheral parts rising gradually obliquely upward as they proceed towards a direction of each of the left side wall and the right side wall.

* * * * *